United States Patent [19]

Sakamoto et al.

[11] Patent Number: 4,500,097
[45] Date of Patent: Feb. 19, 1985

[54] SEAL DEVICE IN DISPLACEMENT MEASURING INSTRUMENT

[75] Inventors: Hitoshi Sakamoto, Kashiwa; Seiji Sakagami; Shigeru Nagashima, both of Kawasaki, all of Japan

[73] Assignee: Mitutoyo Mfg. Co., Ltd., Tokyo, Japan

[21] Appl. No.: 572,320

[22] Filed: Jan. 20, 1984

[30] Foreign Application Priority Data

Jan. 27, 1983 [JP] Japan .................. 58-11656
Jan. 27, 1983 [JP] Japan .................. 58-11657
Jan. 27, 1983 [JP] Japan .................. 58-10184[U]

[51] Int. Cl.$^3$ .................. G01B 5/02; F16J 15/32; F16J 15/40
[52] U.S. Cl. .................. 277/59; 277/29; 277/152
[58] Field of Search .......... 277/29, 58, 59, 152, 277/153, 17, 18, 19

[56] References Cited

U.S. PATENT DOCUMENTS

| | | | |
|---|---|---|---|
| 3,572,379 | 3/1971 | Popa et al. | 277/29 |
| 3,866,924 | 2/1975 | French | 277/59 |
| 3,934,311 | 1/1976 | Thompson | 277/59 |
| 4,010,960 | 3/1977 | Martin | 277/59 |
| 4,094,172 | 6/1978 | Arendt | 277/59 |
| 4,165,881 | 8/1979 | Saljer | 277/152 |
| 4,344,631 | 8/1982 | Winn | 277/29 |
| 4,351,531 | 9/1982 | Maasberg | 277/59 |
| 4,433,846 | 2/1984 | Romero et al. | 277/29 |

FOREIGN PATENT DOCUMENTS 1583378 1/1981 United Kingdom .
1602753 11/1981 United Kingdom .

Primary Examiner—Robert I. Smith
Attorney, Agent, or Firm—Koda and Androlia

[57] ABSTRACT

In a seal device in a displacement measuring instrument, comprising a hollow case fixed to one member, a connecting rod for imparting a displacement of the other member to a displacement detecting mechanism housed in the hollow case through the opening and seal members disposed at opposite sides of the opening, for shielding a penetrating portion of said connecting rod, to enhance the drip-proof performance, a difference is given between the positions of the forward ends of lip members constituting said seal members, whereby the forward end of the lip member disposed at one side where liquid drops are generated is projected farther than the forward end of the lip member disposed at the other side, and/or a liquid receiving groove extending along the opening is provided at least at one side of the inner surface of the hollow case, liquid drain holes are formed in the bottoms of the liquid receiving grooves, filters for excluding dust intruding from outside are provided in the liquid drain holes, and/or liquid breaking means for precluding a liquid flow intruding from outside of the hollow case are provided on the outer peripheral surface of the connecting rod.

18 Claims, 11 Drawing Figures

SEAL DEVICE IN DISPLACEMENT MEASURING INSTRUMENT

BACKGROUND OF THE INVENTION

1. Field of the Invention

This invention relates to a seal device in a displacement measuring instrument, and more particularly to improvements in a seal device in a displacement measuring instrument, suitable for use in a linear type displacement measuring instrument, in which the seal device comprises: a hollow case formed with an opening along a moving line of one member whose relative movement is detectable, which is fixed to the other member whose relative movement is detectable; a connecting rod for imparting a displacement of one member to a displacement detecting mechanism housed in the hollow case through the opening; and seal members disposed at opposite sides of the opening of the hollow case, for shielding a penetrating portion of the connecting rod.

2. Description of the Prior Art

In general, in a measuring instrument for measuring a length or the like of an article, when a movement value of articles relatively movable with each other, such as a movement value of a measuring element to a main body and a movement value of a slider to a column, there have been known displacement measuring instruments, in which a main scale is secured on the one hand and a detector including an index scale is secured on the other hand, and a relative displacement value is read by an optical method or an electromagnetic method for example.

The displacement measuring instruments of the type described, working with high accuracy, and hence, being fine in the construction, there have been a number of problems for maintaining a predetermined accuracy and enhancing the enlarged adaptability to the environment of use, to thereby improve the value of practical use. More specifically, for example, in an optical displacement measuring instrument, in which a main scale and an index scale, both of which have graduations of a micro meter order, are used, it has been necessary that the dust-proof and liquid-proof measures be perfectly taken because a gap between the both scales be maintained in the micro meter order and a comparatively weak light source is used to save the electric power, or the like.

To this end, as shown in FIGS. 1 and 2, there has been adopted a displacement measuring instrument provided therein with a seal device comprising: a hollow case 20 fixed to one member whose relative movement is detectable, e.g., a bed 10 of a machin tool and formed with an opening 20a along a moving line of the other member, e.g., a workpice or a tool 12; a connecting rod 24 for imparting a displacement of the tool 12 to a displacement detecting mechanism 22 housed in the hollow case 20 through the opening 20a; and flexible lip members 26 and 28 made of rubber, the forward ends of which are adapted to come into abutting contact with the connecting rod 24.

In the drawing, designated at 30 is a main scale made of glass or the like, one end portion of which is inserted into a fixing groove 32 provided in the hollow case 20 in the longitudinal direction thereof and fixed thereto by use of a rubber rod 34, a bonding agent 36 and the like, and formed on a scale surface 30a with traverse fringe-shaped graduations, 38 is a slider movable in the longitudinal direction of the main scale 30 in a manner to hold a predetermined positional relationship with the main scale 30 by the virtue of sliding shoes 40 slidable on the surface of the main scale 30; 42 is an index scale fixed to a surface of the slider 38 opposed to the scale surface 30a of the main scale 30 and formed with traverse fringe-shaped gradnations similar to those of the main scale 30; 44 and 46 are a light emitting element and a light receiving element fixed to the slider 38 in a manner to interpose therebetween the main scale 30 and the index scale 42; and 48 is connecting means, in which a linear cantilever spring is used for example, for imparting a movement of the connecting rod 24 to the slider 38.

The above-described seal service, in which a pair of lip members 26 and 28 are used, has such a characteristic feature that this device can effectively prevent dust and oil drops from intruding thereinto, with a comparatively simple arrangement as compared with a device, in which the opening 20a of the hollow case 20 is sealed with magnetized metal belts or brushes. However, it has heretofore been contemplated to decrease the sliding resistance which adversely affects the measuring accuracy first of all in view of the penetrating chracteristics and the transverse moving characteristics of the connecting rod 24 for the relative movement, there have merely been provided the lip members 26 and 28 having the shapes identical with each other in a symmetrical arrangement. As the field of application of the displacement measuring instruments is enlarged in recent years, when the displacement measuring instrument is used as a feedback signal generator in a numerically controlled machine tool for example, there has been such a problem that machine oil intruding through a joined portion of the lip members 26 and 28 cannot be precluded.

With the conventional seal devices, there has also been such a problem that no removing mechanism works to remove the oil drops, which have intruded through a gap between the lip members 26, 28 and the connecting rod 24.

SUMMARY OF THE INVENTION

The present invention has been developed to obviate the above-described problems of the prior art and has as its first object the provision of a seal device in a displacement measuring instrument, capable of effectively preventing liquid drops from intruding into a hollow case.

The present invention has as its second object the provision of a seal device in a displacement measuring instrument, capable of removing liquid drops, which have intruded into a hollow case, to outside before the liquid drops reach a displacement detecting mechanism.

To achieve the first object, the present invention contemplates that, in a seal device in a displacement measuring instrument, comprising: a hollow case formed with an opening along a moving line of one member whose relative movement is detectable, which is fixed to the other member whose relative movement is detectable; a connecting rod for imparting a displacement of one member to a displacement detecting mechanism housed in the hollow case through the opening; flexible lip members provided at opposite sides of the opening of the hollow case, the forward ends of which are adapted to come into abutting contact with the connecting rod; a difference is given between the positions of the forward ends of the lip members, whereby the forward end of the lip member disposed at one side where the liquid drops are generated is projected farther than the forward end of the lip member disposed at the other side.

Furthermore, the width of the lip member at one side is made larger than that of the lip member at the other side, whereby the difference is given between the positions of the forward ends of the lip members.

Or, a cover member softer than the poximal end of the lip member is added to the forward end of the lip member at one side, whereby the difference is given between the positions of the forward ends of the lip members.

Further, the forward ends of the cover member go around the opposite sides of the connecting rod, to thereby enhance the drip-proof performance.

Furthermore, the mounted position of the lip member at one side is shifted from that of the lip member at the other side, whereby the difference is given between the positions of the forward ends of the lip members.

Or, the lip members are mounted to the hollow case in such a manner that the lip members can exchange their positions, whereby the change in mounted positions of the lip members according to the installed position is facilitated.

To achieve the second object, the present invention contemplates that, in a seal device in a displacement measuring instrument comprising: a hollow case formed with an opening along a moving line of one member whose relative movement is detectable, which is fixed to the other member whose relative movement is detectable; a connecting rod for imparting a displacement of one member to a displacement detecting mechanism housed in the hollow case through the opening; and seal members disposed at opposete sides of the opening of the hollow case, for shielding a penetrating portion of the connecting rod; a liquid receiving groove extending along the opening is provided at least at one side of the inner surface of the hollow case, a liquid drain hole or holes communicated with the outside of the hollow case are provided in the bottom or bottoms of the liquid receiving groove or grooves, and the liquid drain hole or holes are provided therein with a filter or filters for excluding dust intruding from outside.

Furthermore, a liquid-proof banks are provided between the liquid receiving groove or grooves and the displacement detecting mechanism in the hollow case, so that the removal of the liquid drops can be reliably effected.

Further, each of the liquid-proof banks has the forward end portion formed of an elastic member abutting against the connecting rod, whereby the liquid drop removing function is further enhanced.

Furthermore, a gradient for quickly guiding the liquid drops, which have intruded, to the liquid receiving groove is rendered to the side surface of the elastic member, which is opposed to the liquid receiving groove, so that, even when the connecting rod is in an upright position, the liquid drops can be quickly removed.

Further, threads for being threadably coupled to a sealing screw are formed in the liquid drain holes or holes, so that the liquid drain hole of the hollow case, when disposed upwardly, can be readily sealed.

Furthermore, the seal members are formed of flexible lip members, the forward ends of which come into abutting contact with the connecting rod.

Or, the seal members are formed of metal belts attracted by magnets disposed at opposite sides of the opening of the hollow case.

To achieve the second object, the present invention contemplates that, in a seal device in a displacement measuring instrument, comprising: a hollow case formed with an opening along a moving line of one member whose relative movement is detectable, which is fixed to the other member whose relative movement is detectable; a connecting rod for imparting a displacement of one member to a displacement detecting mechanism housed in the hollow case through the opening; and seal members disposed at opposite sides of the opening of the hollow case, for shielding a penetrating portion of the connecting rod; further, liquid breaking means for preventing a liquid flow from intruding from the outside of the hollow case is or are provided on the outer surface of the connecting rod.

Furthermore, the liquid breaking means is provided at a position outwardly of the abutting contact portion of the lip members constituting the seal members, whereby the liquid drops outside the hollow case are prevented from reaching the abutting contact portion of the lip members.

Or, the liquid breaking means is provided at a position opposed to the liquid receiving groove formed on the inner surface of the hollow case along the opening portion of the hollow case, so that the liquid drops, which have intruded into the hollow case, cannot reach the displacement detecting mechanism, and the removal of the liquid drops is facilitated.

Furthermore, the liquid breaking means is formed of a ridge, so that a liquid breaking function can be achieved with a comparatively simplified construction.

Or, the liquid breaking means is constituted by a ridge and a groove provided in direct front of the ridge, so that a high liquid breaking function can be achieved.

Furthermore, the liquid breaking means is formed of a groove, so that a liquid breaking function can be achieved with a comparatively simplified construction.

According to the present invention, the liquid drops can be effectively prevented from intruding into the hollow-case. Furthermore, the liquid drops, which have intruded into the hollow case, can be reliably removed. In consequence, the displacement detecting mechanism or the like are not adversely affected.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and and wherein.

DETAILED DESCRIPTION OF THE INVENTION

Detailed description will hereunder be given of the embodiments of the seal device in the linear displacement measuring instrument, to which the present invention is applied, with reference to the drawings.

Figure 1:
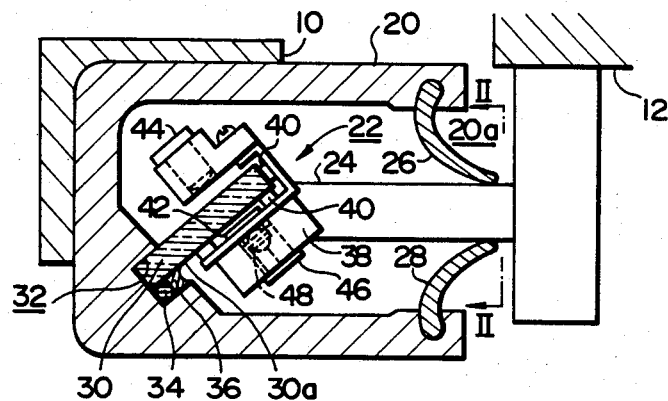
FIG. 1 is a sectional view showing the arrangement of the linear type displacement measuring instrument having an optical displacement detecting mechanism, in which the conventional seal device is adopted.
Figure 2:
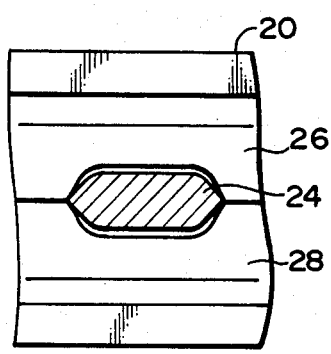
FIG. 2 is a sectional view taken along the line II—II in FIG. 1.
Figure 3:
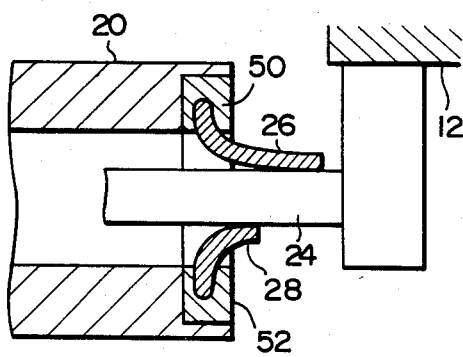
FIG. 3 is a sectional view showing the arrangement of the essential portions of a first embodiment of the seal device in the displacement measuring instrument according to the present invention.

As shown in FIG. 3, according to the first embodiment of the present invention, in the seal device of the linear displacement measuring instrument, comprising a hollow case 20, a connecting rod 24 and lip members 26 and 28, all of which are similar to those of the prior art, the width of the lip member 26 at one side is made larger than that of the lip member 28 at the other side, whereby a difference is given between the positions of the forward ends of the lip members, so that the forward end of the lip member at the side where the oil drops are generated, e.g., the lip member 26 disposed above the connecting rod 24 will be projected farther than the forward end of the lip member 28 disposed below the connecting rod 24.

With the arrangement described above, the oil drops falling down on the hollow case 20 drip down before reaching a joining portion of the lip members 26 and 28, so that the oil drops can be prevented from intruding into the hollow case 20.

Further, if the lip members 26 and 28 are fixed to bases 50 and 52, which are detachable from the hollow case 20, in such a manner that the lip members can exchange their positions, then the positions of the lip members 26 and 28 are exchanged according to the installed position of the hollow case 20, so that the lip member 26 can be always positioned at the side where the oil drops are generated.

Detailed description will hereunder be given of the second embodiment of the present invention.

Figure 4:
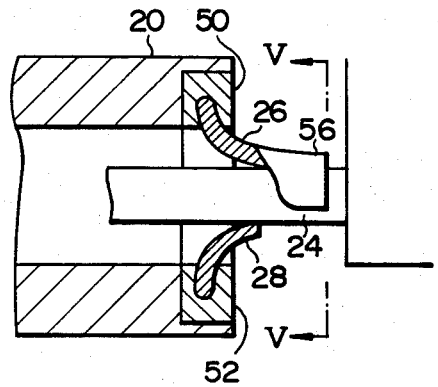
FIG. 4 is a sectional view showing the arrangement of the essential portions of a second embodiment of the seal device according to the present invention.
Figure 5:
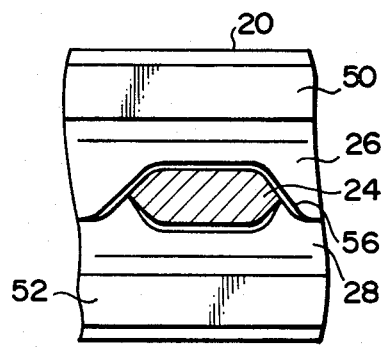
FIG. 5 is a sectional view taken along the line V—V in FIG. 4.

As shown in FIGS. 4 and 5, according to this embodiment, in the seal device of the linear displacement measuring instrument, comprising a hollow case 20, a connecting rod 24, lip memebers 26 and 28, all of which are similar to those of the prior art, a cover member 56 soften than the proximal end of the lip member is added to the forward end portion of the lip member 26 at one side, whereby a difference is given between the positions of the forward ends of the lip members, so that the forward end of the lip member at the side where the oil drops are generated, e.g., the lip member 26 disposed above the connecting rod 24 will be projected farther than the forward end of the lip member 28 disposed below the connecting rod 24.

The forward ends of the cover member 56 go around the opposite sides of the connecting rod 24.

In this embodiment, the cover member 56 can reliably prevent the instrusion of the oil drops. In this case, the quiality of the cover member 56 is softer than that of the proximal end of lip member, whereby the sliding resistance is not greatly increased.

In this embodiment, similarly to the first embodiment, the lip members 26 and 28 are mounted to the hollow case 20 in such a manner that they can exchange their positions, whereby any change in the generating direction of the oil drops can be readily dealt with.

Detailed description will hereunder given of the third embodiment of the present invention.

Figure 6:
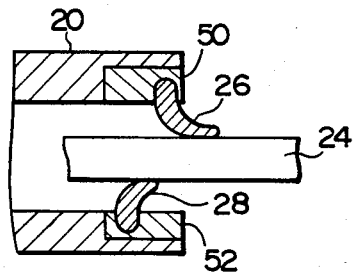
FIG. 6 is a sectional view showing the arrangement of the essential portions of a third embodiment of the seal device according to the present invention.

As shown in FIG. 6, according to this embodiment, in the seal device of the linear displacement measuring instrument, comprising a hollow case 20, a connecting rod 24 and lip members 26 and 28, all of which are similar to those of the prior art, the mounted position of the lip member 26 at one side is shifted from that of the lip member 28 at the other side, whereby a difference is given between the positions of the forward ends of the lip members, so that the forward end of the lip member at the side where the oil drops are generated, e.g., the lip member 26 disposed above the connecting rod 24 will be projected farther than the forward end of the lip member 28 disposed below the connecting rod 24.

In this embodiment, a drip-proof performance can be achieved by the substantially same sliding resistance as that of the prior art.

Detailed description will hereunder given of the fourth embodiment of the present invention.

Figure 7:
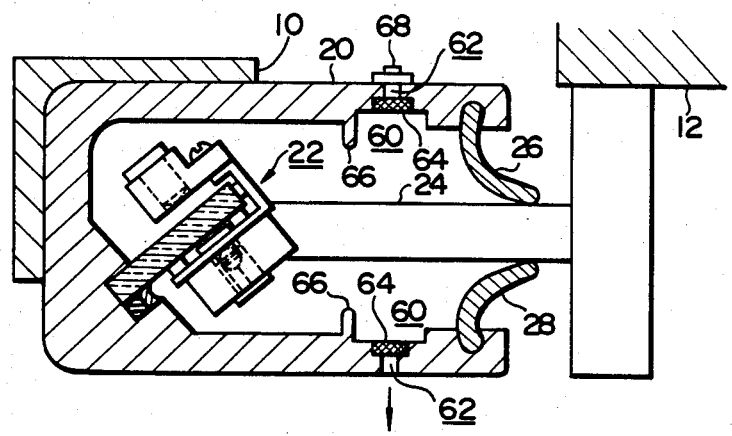
FIG. 7 is a sectional view showing the arrangement of a fourth embodiment of the seal device according to the present invention.

As shown in FIG. 7, according to this embodiment, in the seal device of the linear displacement measuring instrument, comprising a holow case 20, a connecting rod 24 and lip members 26 and 28, all of which are similar to those of the prior art, oil receiving groove or grooves 60 extending along the opening 20a of the hollow case 20 are formed on the inner surface of the hollow case 20, an oil drain hole or holes 62 communicated with the outside of the hollow case 20 are provided in the bottom or bottoms of the oil receiving groove or grooves 60, and the oil drain hole or holes 62 are provided therein with a filter of filters 64 for excluding dust intruding from outside.

Oil-proof banks 66 are provided between the oil receiving grooves 60 and the displacement detecting mechanism 22 in the hollow case 20.

Furthermore, the oil drain hole or holes 62 are formed with threads to be threadably coupled to a sealing screw 68, and the oil drain hole 62, when disposed upwardly, is threadably coupled thereto with the sealing screw 68.

In this embodiment, when the oil drops, which have intruded into the hollow case 20 through a gap formed between the lip members 26, 28 and the connecting rod 24, fall down from the connecting rod 24 before reaching the displacement detecting mechanism 22, the oil drops are collected by the oil receiving grooves 60 and discharged to outside through the oil drain hole 62, so that the oil drops cannot stagnate in the hollow case 20 for a long period of time to adversely affect the displacement detecting mechanism 22. Furthermore, the filter 64 is provided in each of the oil drain hole 62, so that the intrusion of dust from outside can be prevented.

In this embodiment, the oil-proof banks 66 are provided between the oil receiving grooves 60 and the displacement measuring mechanism 22, so that the intrusion of the oil drops toward the displacement detecting mechanism 22 can be reliably prevented.

Furthermore, in this embodiment, the oil receiving grooves 60, the oil drain holes 62, the filters 64 and the oil-proof banks 66 are provided on the both sides of the inner surfaces of the hollow case 20 and hence, even when the installed position of the hollow case 20 is varied, the countermeasure can be readily taken.

Further, the oil drain holes 62 are formed with threads for being threadably coupled to the sealing screws 68, so that the oil drain hole 62 being unused can be easily and reliably sealed, thereby preventing the oil drops and dust through the oil drain hole being unused.

Detailed description will hereunder given of the fifth embodiment of the present invention.

Figure 8:
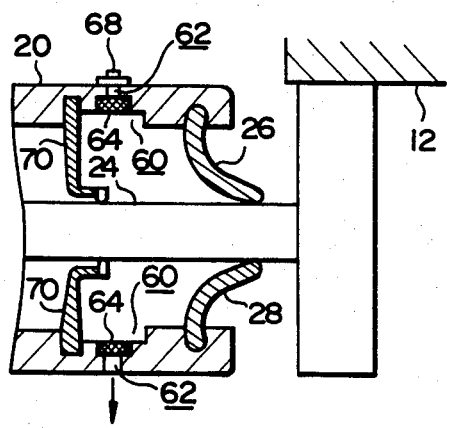
FIG. 8 is a sectional view showing the arrangement of the essential portions of a fifth embodiment of the seal device according to the present invention.

As shown in FIG. 8, according to this embodiment, in the seal device of the linear displacement measuring instrument, comprising a hollow case 20, a connecting rod 24 and lip members 26 and 28, oil receiving grooves 60, oil drain holes 62, filters 64 and sealing screws 68, all of which are similar to those of the fourth embodiment, oil-proof banks, the forward ends of which are formed of elastic members 70 and adapted to come into abutting contact with the connecting rod 24, are provided between the oil receiving grooves 60 and the displacement detecting mechanism 22. Other respects are similar to the fourth embodiment, so that the detailed description will be omitted.

In this embodiment, the removal of the oil drops travelling along the connecting rod 24 can be reliably effected by the elastic members 70.

Figure 9:
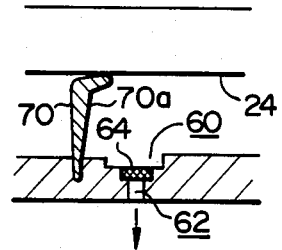
FIG. 9 is a sectional view showing a modification of the fifth embodiment of the present invention.

As shown in FIG. 9, a gradient 70a for quickly guiding the oil drops, which have intruded, to the oil receiving grooves 60 is rendered to the side surface of the elastic member 70, which is opposed to the oil receiving groove 60, so that, even when the connecting rod 24 is used in an upright position, the oil drops, which have intruded, can be quickly guided to the oil receiving grooves 60.

Furthere, in addition to the arrangements of the above-described embodiment, the oil drain hole 62 is conected to a discharge pump driven by the relative movement of the connecting rod 24 for example, so that the oil drop removing function can be further enhanced.

Detailed description will hereunder given of the sixth embodiment of the present invention.

Figure 10:
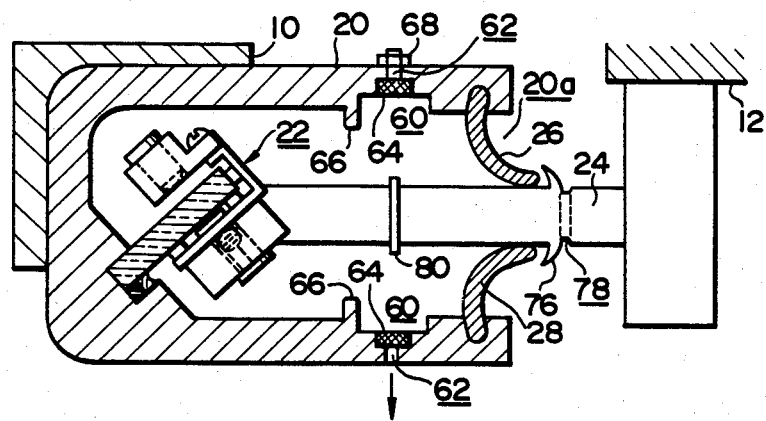
FIG. 10 is a sectional view showing the arrangement of a sixth embodiment of the seal device according to the present invention.

As shown in FIG. 10, according to this embodiment, in the seal device of the linear displacement measuring instrument, comprising a hollow case 20, a connecting rod 24 and lip members 26 and 28, all of which are similar to those of the prior art, the oil receiving grooves 60 extending along the opening 20a of the hollow case 20 are provided on the both sides of the inner surface of the hollow case 20, respectively, the oil drain holes 62 communicated with the outside of the hollow case 20 are formed in the bottoms of the oil receiving grooves 60, respectively, the filters 64 for excluding dust intruding from outside are provided in the oil drain holes 62, respectively, there is provided on the outer peripheral surface of the connecting rod 24 and outwardly of the abutting contact portion of the lip members 26 and 28 first liquid breaking means constituted by a jaw-shaped ridge 76 and a U-shaped groove 78 formed in direct front of the jaw-shaped ridge 76, for preventing the oil drops outside the hollow case 20 from reaching the abutting contact portion of the lip members 26 and 28, and further, there is provided on the outer peripheral surface of the connecting rod 24 and at a position opposed to the oil receiving grooves 60 of the connecting rod 24 second liquid breaking means formed of a ridge 80, for preventing the oil drops, which have intruded into the hollow case 20, from reaching the displacement detecting mechanism 22.

Provided between the oil receiving grooves 60 and the displacement detecting mechanism 22 in the hollow case 20 are the oil-proof banks 66 for reliably preventing the oil drops falling down into the oil receiving grooves 60 from intruding toward the displacement detecting mechanism 22.

Furthermore, each of the oil drain holes 62 is formed with the threads for being threadably coupled to the sealing screw 68, and the oil drain hole 62 being unused, as shown upwardly in drawing, can be readily and reliably sealed, thereby preventing the oil drops and dust from intruding through the oil drain hole being unused.

In this embodiment, the oil drops falling down from the tool 12 firstly reach the first liquid breaking means constituted by the jaw-shaped ridge 76 and the U-shaped groove 78 before reaching the joining portion of the lip members 26, 28 and the connecting rod 24, whereby most of oil drops are caused to fall downwardly of the connecting rod 24.

Futrther, the oil drops, which have intruded into the hollow case 20 through the joining portion between the lip members 26, 28 and the connecting rod 24, are caused to fall downwardly of the connecting rod 24 by the second liquid breaking means comprising the ridge 80, collected by the oil grooves 60 formed thereat, and discharged to outside from the oil drain hole 62 through the filter 64. In consequence, the oil drops intruding into the hollow case 20 can be greatly reduced in amount, and, even if the oil drops intrude into the hollow case 20, the oil drops are precluded by the ridge 80, whereby the oil drops do not proceed to the displacement detecting mechanism 22. Furthermore, the oil receiving grooves 60 are provided therein with the oil drain holes 62, respectively, so that the oil drops cannot stagnate in the hollow case 20 for a long period of time to adversely affect the displacement measuring instrument 22. Furthere, the oil drain holes 62 are provided therein with the filters 64, respectively, the intrusion of the dust from outside can be prevented.

In this embodiment, the liquid breaking means are provided on the upper and lower surfaces of the connecting rod 24, and further, the oil drain holes 62, the filters 64 and the oil-proof banks 66 are provided on the both sides of the inner surface of the hollow case 20, so that any change in the installed position of the hollow case 20 can be easily dealt with.

Detailed description will hereunder given of the seventh embodiment of the present invention.

Figure 11:
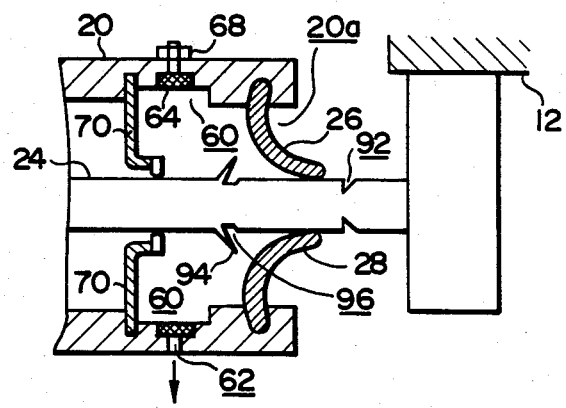
FIG. 11 is a sectional view showing the arrangement of the essential portions of a seventh embodiment of the seal device according to the present invention.

As shown in FIG. 11, according to this embodiment, in the seal device of the linear displacement measuring instrument, comprising a hollow case 20, a connecting rod 24 and lip members 26 and 28, oil receiving grooves 60, oil drain holes 62, filters 64 and a sealing screw 68, all of which are similar to those of the sixth embodiment, the oil-proof banks each having the forward end portion formed of an elastic member 70 abutting against the connecting rod 24 is provided between the oil receiving grooves 60 and the displacement detecting mechanism 22, there is provided on the outer peripheral surface of the connecting rod 24, disposed outwardly of the abutting contact portion of the lip members 26 and 28 first liquid breaking means constituted by a groove 92, for preventing the oil drops outside the hollow case 20 from reaching the abutting contact portion of the lip members 26 and 28, and further, there is provided on the outer peripheral surface of the connecting rod 24 and at an intermediate portion between the abutting contact portion of the lip members 26, 28 with the connecting rod 24 and the abutting contact portion of the elastic members 70 with the connecting rod 24 second liquid breaking means constituted by a V-shaped ridge 94 and a U-shaped groove 96 formed in direct front of the V-shaped redge 94, for preventing the oil drops, which have intruded into the hollow case 20, from reaching the displacement detecting mechanism 22. Other respects are similar to those in the sixth embodiment, so that detailed description will be omitted.

In this embodiment, the removal of oil drops travelling along the connecting rod 24 can be reliably effected by the elastic members 70.

In addition, in the embodiment 4 through 7, the seal members shielding the penetrating portion of the connecting rod 24 have been the lip members 26 and 28, however, the arrangement of the seal members need not necessarily be limited to this, and, for example, such an arrangement may be adopted that metal belts may be attracted by magnets disposed at opposite sides of the opening 20a of the hollow case 20.

Furthermore, in the above-described embodiment, the present invention has been applied to the linear displacement measuring instrument provided with the optical displacement detecting mechanism, however, the scope of application of the present invention need not necessarily be limited to this, and, it is apparent that the present invention is applicable to other displacement measuring instruments such as a linear displacement measuring instrument provided with an electromagnetic displacement detecting mechanism.

What is claimed is:

1. A seal device in a displacement measuring instrument, comprising:
    a hollow case formed with an opening along a moving line of one member whose relative movement is detectable, which is fixed to the other member whose relative movement is detectable;
    a connecting rod for imparting a displacement of said one member to a displacement detecting mechanism housed in said hollow case through the opening;
    seal members disposed at opposite sides of said opening of the hollow case, for shielding a penetrating portion of said connecting rod;
    at least one liquid receiving groove extending along said opening and provided at least at one side of the inner surface of said hollow case;
    at least one liquid-proof bank provided between said liquid receiving groove and said displacement detecting mechanism;
    at least one liquid drain hole communicating with the outside of said hollow case and provided in the bottom of said liquid receiving groove; and
    at least one filter provided in said liquid drain hole for excluding dust intruding from the outside.

2. A seal device in a displacement measuring instrument as set forth in claim 1, wherein said liquid-proof banks have the forward ends of which are formed of elastic members abutting against said connecting rod.

3. A seal device in a displacement measuring instrument as set forth in claim 2, wherein a gradient for quickly guiding the liquid drops, which have intruded, to said liquid receiving groove is rendered to a side surface of said elastic member, said side surface being opposed to said liquid receiving groove.

4. A seal device in a displacement measuring instrument as set forth in claim 1, wherein threads for being threadably coupled to a sealing screw are formed in the liquid drain hole or holes.

5. A seal device in a displacement measuring instrument as set forth in claim 1, wherein said seal members are metal belts attracted by magnets disposed at opposite sides of the opening of said hollow case.

6. A seal device in a displacement measuring instrument as set forth in claim 1, wherein said seal members are formed of flexible lip members having the forward ends coming into abutting contact with said connecting rod.

7. A seal device in a displacement measuring instrument as set forth in claim 6, wherein the flexible lip members are provided at opposite sides of the opening of said hollow case in such a manner that a difference is provided between the positions of the forward ends of said lip members, whereby the forward ends of the lip member disposed at one side where the liquid drops are generated is projected further than the forward end of the lip member disposed on the other side.

8. A seal device in a displacement measuring instrument as set forth in claim 7 wherein the width of the lip member at one side is made larger than that of the lip member at the other side, whereby said difference is given between the positions of the forward ends of said lip members.

9. A seal device in a displacement measuring instrument as set forth in claim 7, wherein a cover member softer than the poximal end of the lip member is added to the forward end of the lip member at one side, whereby said difference is given between the ositions of the forward ends of the said members.

10. A seal device in a displacement measuring instrument as set forth in claim 9, wherein the forward ends of the cover member go around the opposite sides of said connecting rod.

11. A seal device in a displacement measuring instrument as set forth in claim 7, wherein the mounted position of the lip member at one side is shifted from that of the lip member at the other side, whereby said difference is given between the positions of the forward ends of the said members.

12. A seal device in a displacement measuring instrument as set forth in claim 7, wherein said lip members are mounted to said hollow case in such a manner that said lip members can exchange their positions.

13. A seal device in a displacement measuring instrument comprising:
    a hollow case formed with an opening along a moving line of one member whose relative movement is detectable, which is fixed to the other member whose relative movement is detectable;
    a connecting rod for imparting a displacement of said one member to a displacement detecting mechanism housed in said hollow case through the openings;
    seal members disposed at opposite sides of said opening of said hollow case for shielding a penetrating portion of said connecting rod;

liquid breaking means provided on the outer peripheral surface of said connecting rod for preventing a liquid flow from intruding from the outside of said hollow case;

at least one liquid receiving groove extending along said opening provided at least at one side of the inner surface of said hollow case;

at least one liquid-proof bank provided between said liquid receiving groove and said displacement detecting mechanism;

at least one liquid drain hole communicating with the outside of said hollow case and provided in the bottom of said liquid receiving groove; and at least one filter provided in said liquid drain hole for excluding dust intruding from the outside.

14. A seal device in a displacement measuring instrument as set forth in claim 13, wherein said liquid breaking means is provided outwardly of the abutting contact portion of lip members comprising said seal members.

15. A seal device in a displacement measuring instrument as set forth in claim 13, wherein said liquid breaking means is provided at a position opposed to a liquid receiving groove or gooves formed on the inner surface of said hollow case.

16. A seal device in a displacement measuring instrument as set forth in claim 13, wherein said liquid breaking means comprises a ridge.

17. A seal device in a displacement measuring instrument as set forthe in claim 13, wherein said liquid breaking means comprises a ridge and a groove formed in direct front of said ridge.

18. A seal device in a displacement measuring instrument as set forth in claim 13, wherein said liquid breaking means comprises a groove.

* * * * *